United States Patent
Choudhury et al.

(10) Patent No.: US 11,423,127 B2
(45) Date of Patent: Aug. 23, 2022

(54) RESILIENT WATERMARKING

(71) Applicant: International Business Machines Corporation, Armonk, NY (US)

(72) Inventors: Olivia Choudhury, Cambridge, MA (US); Aris Gkoulalas-Divanis, Waltham, MA (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 16/708,518

(22) Filed: Dec. 10, 2019

(65) Prior Publication Data

US 2021/0173903 A1 Jun. 10, 2021

(51) Int. Cl.
*G06F 21/16* (2013.01)
*G06F 16/22* (2019.01)
(Continued)

(52) U.S. Cl.
CPC .......... *G06F 21/16* (2013.01); *G06F 16/2255* (2019.01); *G06F 16/2322* (2019.01);
(Continued)

(58) Field of Classification Search
CPC ............... G06F 16/2322; G06F 21/602; G06F 2221/0733; G06F 16/2255; G06F 21/64; G06F 16/284; G06F 16/9014; G06F 21/16; H04L 2209/38; H04L 2209/608; H04L 63/00; H04L 9/3239; H04L 9/0637
(Continued)

(56) References Cited

U.S. PATENT DOCUMENTS 10,176,309 B2   1/2019 Tormasov et al.
10,236,006 B1*  3/2019 Gurijala .................. G10L 19/06
(Continued)

FOREIGN PATENT DOCUMENTS

CN   108053359 A   5/2018
CN   109003076 A   12/2018
(Continued)

OTHER PUBLICATIONS

Halder et al.: "Watermarking Techniques for Relational Databases: Survey, Classification and Comparison", Journal of Universal Computer Science, vol. 16, No. 21 (2010), 3164-3190, Dec. 18, 2009 (Year: 2009).*

(Continued)

*Primary Examiner* — Kuen S Lu
(74) *Attorney, Agent, or Firm* — Timothy J. Singleton (57) ABSTRACT

A method, system, and computer program product for detecting data tampering with resilient watermarking is provided. The method accesses a first relational data set on a data repository. The first relational data set includes a plurality of data elements. The first relational data set is sorted to generate a first sorted list and a second sorted list of the plurality of data elements. The method generates a watermark from the first sorted list and the second sorted list. The watermark contains a hash corresponding to the first sorted list and the second sorted list of the plurality of data
(Continued)

elements. In response to an access request for the first relational data set, the method verifies an integrity of the first relational data set based on the watermark.

20 Claims, 6 Drawing Sheets

(51) Int. Cl.
    *G06F 16/23*     (2019.01)
    *G06F 16/28*     (2019.01)
    *G06F 21/60*     (2013.01)
    *H04L 9/06*     (2006.01)

(52) U.S. Cl.
    CPC .......... *G06F 16/284* (2019.01); *G06F 21/602* (2013.01); *H04L 9/0637* (2013.01)

(58) Field of Classification Search
    USPC ........................................................ 713/716
    See application file for complete search history.

(56) References Cited

U.S. PATENT DOCUMENTS

| | | | |
|---|---|---|---|
| 2004/0002816 A1* | 1/2004 | Milosavljevic | G16B 30/00 702/19 |
| 2006/0095775 A1* | 5/2006 | Jajodia | G06F 16/24553 713/176 |
| 2011/0271190 A1* | 11/2011 | Kort | H04N 21/2743 715/719 |
| 2018/0121923 A1 | 5/2018 | Uhr et al. | |
| 2018/0343128 A1 | 11/2018 | Uhr et al. | |
| 2019/0373309 A1* | 12/2019 | Fahnestock | H04N 21/8106 |

FOREIGN PATENT DOCUMENTS

| | | |
|---|---|---|
| CN | 109241708 A | 1/2019 |
| CN | 109711120 A | 5/2019 |

OTHER PUBLICATIONS

Ma et al., "Blockchain for digital rights management", Future Generation Computer Systems 89, Jul. 2018, Research Gate, DOI: 10.1016/j.future.2018.07.029, 20 pages.

Bhowmik et al., "The multimedia blockchain: A distributed and tamper-proof media transaction framework", 2017 22nd International Conference on Digital Signal Processing (DSP), Nov. 2017, IEEE, 7 pages.

Meng et al., "Design scheme of copyright management system based on digital watermarking and blockchain", 2018 IEEE 42nd Annual Computer Software and Applications, (COMPSAC), vol. 2, IEEE, 2018, 6 pages.

Agrawal et al., "Watermarking Relational Databases", VLDB'02: Proceedings of the 28th International Conference on Very Large Databases, 2002, China, 12 pages.

Sion et al., "Rights protection for relational data", IEEE Transactions on Knowledge and Data Engineering, vol. 16, No. 12, Dec. 2004, 17 pages.

Panah et al., "On the Properties of Non-Media Digital Watermarking: A Review of State of the Art Techniques", Special Section on Latest Advances and Emerging Applications of Data Hiding, vol. 4, 2016, Digital Object Identifier 10.1109/Access.2016.2570812, 35 pages.

* cited by examiner

RESILIENT WATERMARKING

BACKGROUND

Data repositories, such as cloud-based repositories, store large numbers of data sets. These data sets often contain proprietary or sensitive information. To detect data tampering, data repositories often compute and maintain a hash for various data sets stored within the data repositories. However, users or owners of data stored on such data repositories often modify or change their data. Some data tampering methods used by data repositories lack resilience to changes within data sets. Such systems often employ complimentary methodologies to detect data tampering and maintain resilience to natural or permissive data changes.

SUMMARY

According to an embodiment described herein, a computer-implemented method for detecting data tampering that is resilient to structural changes of the data (such as reordering of records or data elements of the records) that do not impact the content of the data, is provided. The method accesses a first relational data set on a data repository. The first relational data set includes a plurality of data elements. The first relational data set is sorted to generate a first sorted list and a second sorted list of the plurality of data elements. The method generates a watermark from the first sorted list and the second sorted list. The watermark contains a hash corresponding to the first sorted list and the second sorted list of the plurality of data elements. In response to an access request for the first relational data set, the method verifies an integrity of the first relational data set based on the watermark.

According to an embodiment described herein, a system for detecting data tampering with resilient watermarking is provided. The system includes one or more processors and a computer-readable storage medium, coupled to the one or more processors, storing program instructions that, when executed by the one or more processors, cause the one or more processors to perform operations. The operations access a first relational data set on a data repository. The first relational data set includes a plurality of data elements. The first relational data set is sorted to generate a first sorted list and a second sorted list of the plurality of data elements. The operations generate a watermark from the first sorted list and the second sorted list. The watermark contains a hash corresponding to the first sorted list and the second sorted list of the plurality of data elements. In response to an access request for the first relational data set, the operations verify an integrity of the first relational data set based on the watermark.

According to an embodiment described herein a computer program product for detecting data tampering with resilient watermarking is provided. The computer program product includes a computer readable storage medium having program instructions embodied therewith, the program instructions being executable by one or more processors to cause the one or more processors to access a first relational data set on a data repository. The first relational data set includes a plurality of data elements. The first relational data set is sorted to generate a first sorted list and a second sorted list of the plurality of data elements. The computer program product generates a watermark from the first sorted list and the second sorted list. The watermark contains a hash corresponding to the first sorted list and the second sorted list of the plurality of data elements. In response to an access request for the first relational data set, the computer program product verifies an integrity of the first relational data set based on the watermark.

DETAILED DESCRIPTION

The present disclosure relates generally to methods for detecting data tampering within a data repository. More particularly, but not exclusively, embodiments of the present disclosure relate to a computer-implemented method for watermarking which is resilient to reordering and changes within data sets of a data repository. The present disclosure relates further to a related system for detecting data tampering with resilient watermarking, and a computer program product for operating such a system.

Cloud-based data repositories store large numbers of data sets. These data sets may contain proprietary or sensitive information. For example, data repositories routinely store information relating to customers, companies, user activities, purchase records, patient information and medical history, and the like. Data repositories, including cloud-based systems, would benefit from systems and methods capable of detecting data tampering in stored data sets prior to using that data for analytic or other purposes. Although some data repositories use watermarks, typical watermarks foul or are invalidated when any changes, including reordering of data elements or records, or changing representations, occur within a data set. When the watermark is fouled or invalidated, the underlying data set may be deemed compromised as a false positive. As a result, data repositories would benefit from data tampering methods which are resilient to normal and permissible data restructuring or modification, such as reordering data or adding additional information to data tables that do not modify original values on which a watermark was generated.

Some data repositories verify against data tampering by computing and maintaining hashes for certain data sets. Such hashes often fail to accommodate for changes to the data structure that do not impact the content and use of the data. Further, such hashes often fail to accommodate for additions to data which do not otherwise affect prior iterations of the data set. For example, a data set may be expected to lead to a same set of analytic results when the records, rows, and/or columns are stored in any order. This is because the association of an individual attribute value to a data record is not affected by reordering. Given different forms of data storage, it is possible for a data set to be stored in a representation that changes the original sequence of rows and/or columns. For example, an original data set may be stored in a CSV format and moved to a JSON format that is used as input for a data analytics algorithm. The transformation changes the structure of the data and may additionally change the sequence in which the data attributes and records are stored. Similarly, a number of data sets under a same schema may need to be examined, which may result in changing orders of certain columns in one data set to match those of another data set. Further, an order of records in a data set may change if the change is suitable to group records based on one or more common characteristics, such as sorting by a particular column.

Embodiments of the present disclosure provide resilient watermarking capabilities to address deficiencies within data repositories. This resilient watermarking enables detection of data tampering, while being resilient to changes in data sets. The watermarking of the present disclosure remains resilient to changes including reordering of data sets, modifications to data sets, and other suitable and relevant manipulations. Embodiments of the present disclosure enable data protection approaches which are resilient to reordering of rows and columns within a data set. Embodiments of the present disclosure enable generation of a watermark of a data set which is resilient to storage requirements for varying data sets, eases computation processes, and facilitates data verification. Resilient watermarks of the present disclosure are configured for simple computation from data sets, to verify at a later time. The size of the resilient watermarks is configurable, such that a data owner can bound storage requirements of the watermark. Embodiments of the present disclosure include resilient watermarks generated by a probabilistic approach, enabling configurable sizes. Further, embodiments of the present disclosure enable blockchain supported watermarking, for relational data tables consisting of multiple numerical and/or categorical attributes, which can be used to detect data tampering and remain resilient to reordering of rows and columns within the data table. Embodiments of the present disclosure may enable maintaining of a secure, tamper-proof, and lightweight record of watermarks for multiple data sets maintained by a data repository.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
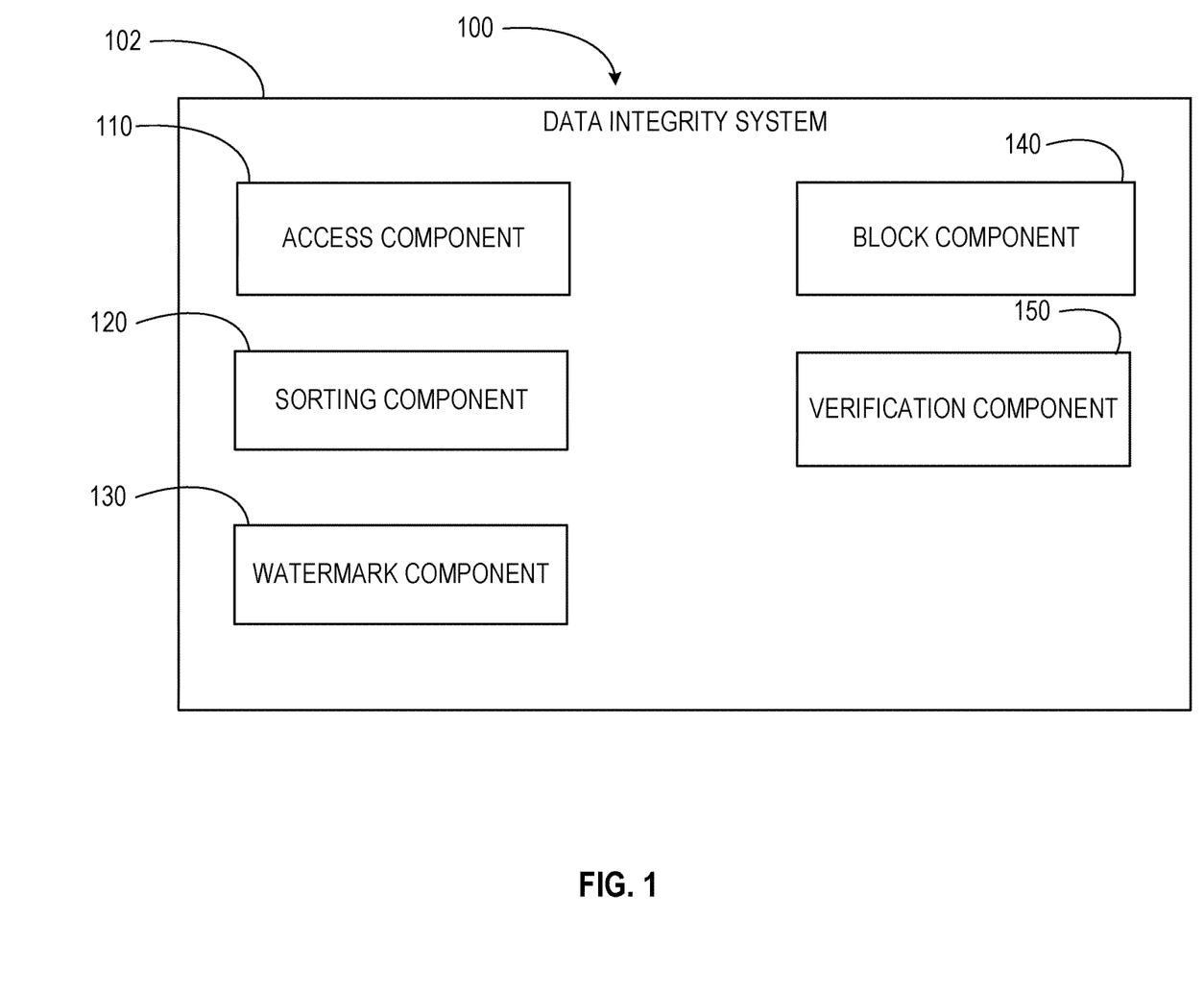
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a data integrity system 102. The data integrity system 102 may comprise an access component 110, a sorting component 120, a watermark component 130, a block component 140, and a verification component 150. The access component 110 accesses and modifies relational data sets stored within data repositories. The sorting component 120 sorts relational data sets into sorted lists for watermark generation. The watermark component 130 generates watermarks from sorted lists for relational data sets within a data repository. The block component 140 generates blocks, containing watermarks generated for relational data sets, within a blockchain framework of a data repository. The verification component 150 verifies integrity of relational data sets based on blocks and watermarks corresponding to those relational data sets. Although described with distinct components, it should be understood that, in at least some embodiments, components may be combined or divided, or additional components may be added, without departing from the scope of the present disclosure.

Figure 2:
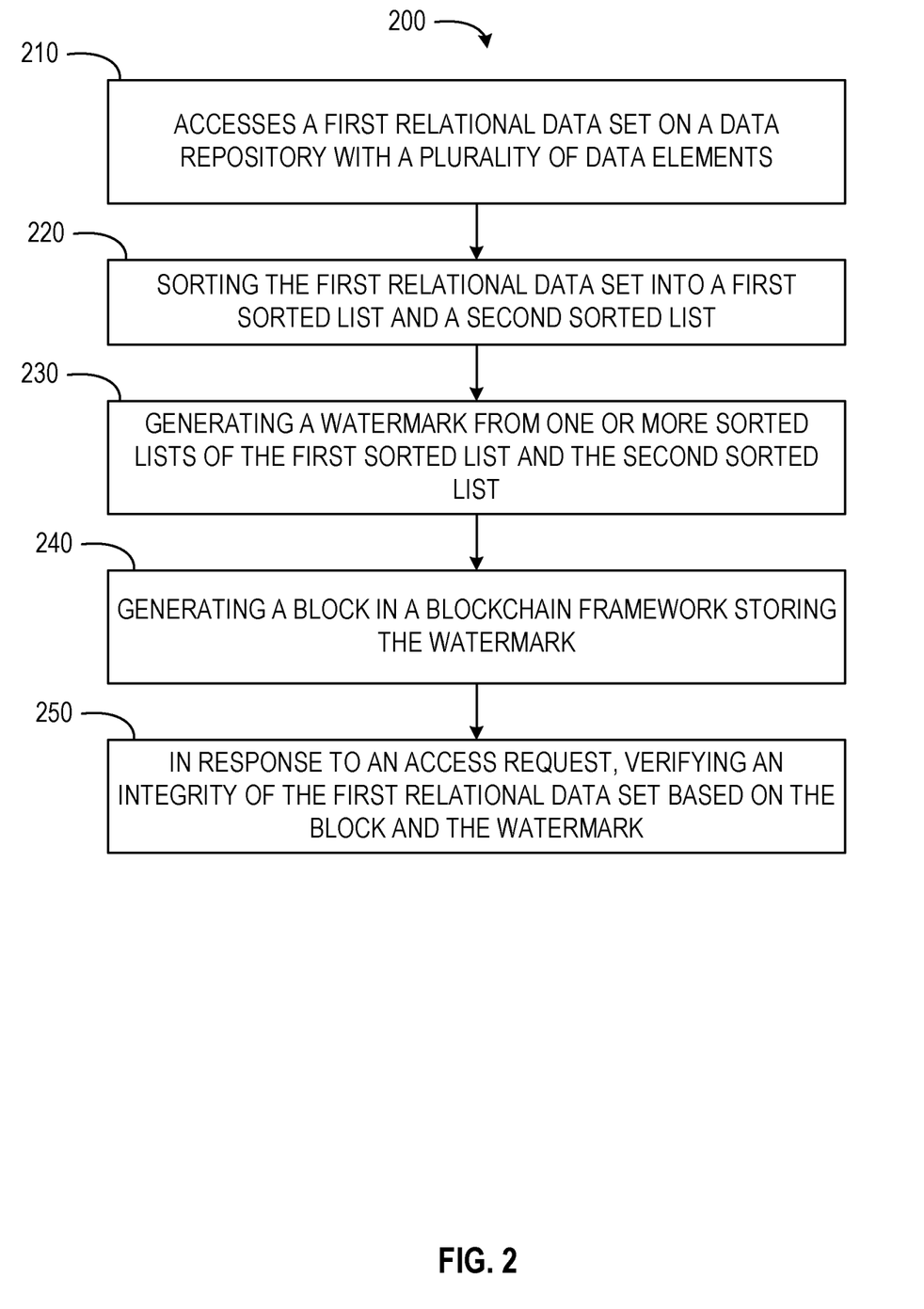
FIG. 2 depicts a flow diagram of a computer-implemented method for detecting data tampering with resilient watermarking, according to at least one embodiment.

Referring now to FIG. 2, a flow diagram of a computer-implemented method 200 is shown. The computer-implemented method 200 is a method for detecting data tampering with resilient watermarking. In some embodiments, the computer-implemented method 200 may be performed by one or more components of the computing environment 100, as described in more detail below.

At operation 210, the access component 110 accesses a first relational data set on a data repository. The data repository may be stored on a computing device, a server, a cloud-computing platform, combinations thereof, or any other accessible device or set of devices. The data repository may have or be populated by a plurality of relational data sets. Each relational data set may include one or more relational data table. The first relational data set may include a plurality of data elements. The plurality of data elements may consist of multiple numerical values, alphanumerical values, categorical attributes, combinations thereof, or any other suitable and relevant values or aspects. An example of a relational data set is depicted below at Table 1. Table 1 provides a relational data set consisting of two columns with numerical values (i.e., ID and age) and three columns with alphanumeric values (i.e., diagnosis, medication, dosage/day).

TABLE 1

| ID | Age | Diagnosis | Medication | Dosage/day |
|---|---|---|---|---|
| 1 | 30 | schizophrenia | questiapine | 50 mg |
| 2 | 60 | arthritis | ibuprofen | 500 mg |
| 3 | 45 | thyroid | levoxyl | 20 mcg |
| 4 | 25 | ulcer | antacid | 400 mg |

The access component 110 may access the first relational data set based on a watermark request, designating the first relational data set for generation of a watermark for later data integrity operations. The access component 110 may also access the first relational data set in response to the first relational data set being uploaded, stored, or otherwise added to the data repository.

At operation 220, the sorting component 120 sorts the first relational data set. In some embodiments, the first relational data set is sorted into a first sorted list and a second sorted list. Each sorted list may include the plurality of data elements of the relational data set from which the sorted list was generated. In some embodiments, the first sorted list is a numeric sorted list. In such embodiments, the second sorted list is an alphanumeric sorted list.

In some embodiments, the first relational data set is represented as a data set "D." The first relational data set may be understood as a N×M relational data set, where N and M represent a number of rows and columns, respectively. The data set may be understood as having a set of attributes "A" within the data set. The attributes "A" may include both numerical, alphanumerical, and categorical attributes. The first sorted list may be represented as "$L_N$," and store all numeric values of all numeric attributes within the first relational data set (D). The second sorted list may be represented as "$L_{AN}$" and store all alphanumeric values of the categorical attributes in the first relational data set (D). The first sorted list, $L_N$, and the second sorted list, $L_{AN}$, may initially be created by the sorting component 120. After creation of the lists, the sorting component 120 may sort $L_N$ and $L_{AN}$ to generate $L'_N$ and $L'_{AN}$. In some embodiments, generating the prime versions of the sorted lists ensures that the order of values after sorting remains unchanged. Even if rows or columns of the first relational data set are changed, shuffled, or reordered, the order of values may remain unchanged within the sorted lists. This may contribute to resiliency of a watermark generated for the first relational data set.

By way of the example of relational data set Table 1, the sorting component 120 may create lists $L_N$ and $L_{AN}$ of numeric and alphanumeric values, respectively. For example, list $L_N$ may be selected as $L_N$=[1, 30, 2, 60, 3, 45, 4, 25] and list $L_{AN}$ may be selected as $L_{AN}$=['schizophrenia', 'quetiapine', '50 mg', 'arthritis', . . . , 'ulcer', 'antacid', '400 mg']. The sorting component 120 may sort each list to create $L'_N$ and $L'_{AN}$. $L'_N$ may be sorted as $L'_N$=[1, 2, 3, 4, 25, 30, 45, 60]. $L'_{AN}$ may be sorted as $L'_{AN}$=['20 mcg', '50 mg', '400 mg', '500 mg', . . . , 'schizophrenia', 'thyroid', 'ulcer' ].

At operation 230, the watermark component 130 generates a watermark from one or more sorted lists generated from the first relational data set. In some embodiments, the watermark component 130 generates the watermark from the first sorted list and the second sorted list of the plurality of data elements. The watermark contains a hash corresponding to the first sorted list and the second sorted list of the plurality of data elements.

In some embodiments, the watermark is generated by selecting a subset of data elements from the first sorted list and the second sorted list. The selection of the subset of data elements may be specified by a user. In some embodiments, the selection of the subset of data elements is a probabilistic selection of data elements from the first sorted list and the second sorted list. In some embodiments, selecting the subset of data elements from the first sorted list and the second sorted list provides a list of index values for the subset of data elements. The selection of the subset of data elements may be based on a specified level of confidence. For example, the selection may be based on a number of data elements configured to provide a confidence value (e.g., a "p" value discussed below) above a specified confidence threshold. In such instances, a higher number of indices may be selected to generate a relatively higher confidence level in the verification of a resulting watermark. The selection of data elements may also be based on a size of the relative data set. In such embodiments, a number of data elements may be selected based on the size of the data set, up to half of the elements in the data set.

The watermark component 130 generates an element template from the subset of data elements and the first and second sorted lists. The element template may contain a sequence of tuples including a list value and an index value. The list value may include a value from the first sorted list or the second sorted list. In some embodiments, list $L_N$ has $|L_N|$ entries and list $L_{AN}$ has $|L_{AN}|$ entries. In such embodiments, the watermark component 130 creates a template "T" by selecting at random, without replacement, α indices from 1 . . . $|L_N|$ and β indices from 1 . . . $|L_{AN}|$. The selection process, for selecting indices from the first sorted list and the second sorted list, may be structured or arbitrary. For example, the selection process may be sequential, probabilistic, random, combinations thereof, or any other suitable selection methodology. In some instances, the watermark component 130 selects first indices for list $L_N$ followed by indices for list $L_{AN}$. The watermark component 130 may also select, at random, a list of the first sorted list and the second sorted list to use. The watermark component 130 may then select and extract indices from the selected list. In some embodiments, selection by the watermark component 130 may be represented by Equation 1, shown below.

$$p=(α+β)/(N×M) \qquad \text{Equation 1}$$

In Equation 1, p may represent an expected accuracy of verification, of the watermark using the element template, as a value in 0 to 1. The watermark component then generates the hash from the element template and the corresponding subset of data elements.

In some embodiments, for each index in template T, the watermark component 130 fetches corresponding values from $L'_N$, $L'_{AN}$, or a combination thereof. The sequence of retrieved values, selected based on the template, may be represented as list $L_V$. In such embodiments, the watermark component 130 generates or computes a hash "H" of the list $L_V$ for the watermark. The hash "H" may be a SHA-256 hash. In some embodiments, the hash "H" is generated from the list $L_V$ based on a one-way cryptographic hash function. In some embodiments, once generated, the hash "H" acts as the watermark for the first relational data set (e.g., relational data set D).

With respect to the example for Table 1, an element template may be generated as template T={'$L_N$': [2, 5, 6], '$L_{AN}$': [0, 3, 11] }. The template in this example may imply that from the list $L_N$, values were fetched corresponding to indices 2, 5, and 6. From $L_{AN}$, values were fetched for indices 0, 3, and 11. The values may be concatenated to create the list $L_V$. In such instances, the list $L_V$=[3, 30, 24, '20 mcg', '500 mg', 'ulcer']. The watermark component 130 may use a one-way cryptographic hash function to compute the hash of the list $L_V$. For the example of Table 1, the SHA-256 hash for the list $L_V$ may be a value of "1d77a05b0466c045054e960212009547db13b4c50551a34c2b0aad4d62589a9b." The computed hash value may be used as the watermark for Table 1 and stored along with the element template in the blockchain framework, described in more detail below. The watermark's basis on a sorted list enable the watermark to be resilient to row and column reordering based on updates in the relational data set.

At operation 240, the block component 140 generates a block in a blockchain framework. The blockchain framework may be a blockchain framework of the data repository. In some embodiments, the blockchain framework is a private blockchain for the data repository. The private blockchain may be an immutable distributed ledger for the data repository. The blockchain may be a private blockchain configured to protect privacy and security of the watermarks and associated data of the data repository. The private blockchain may be accessible by administrators and devices of the data repository and known validated users or devices.

Figure 3:
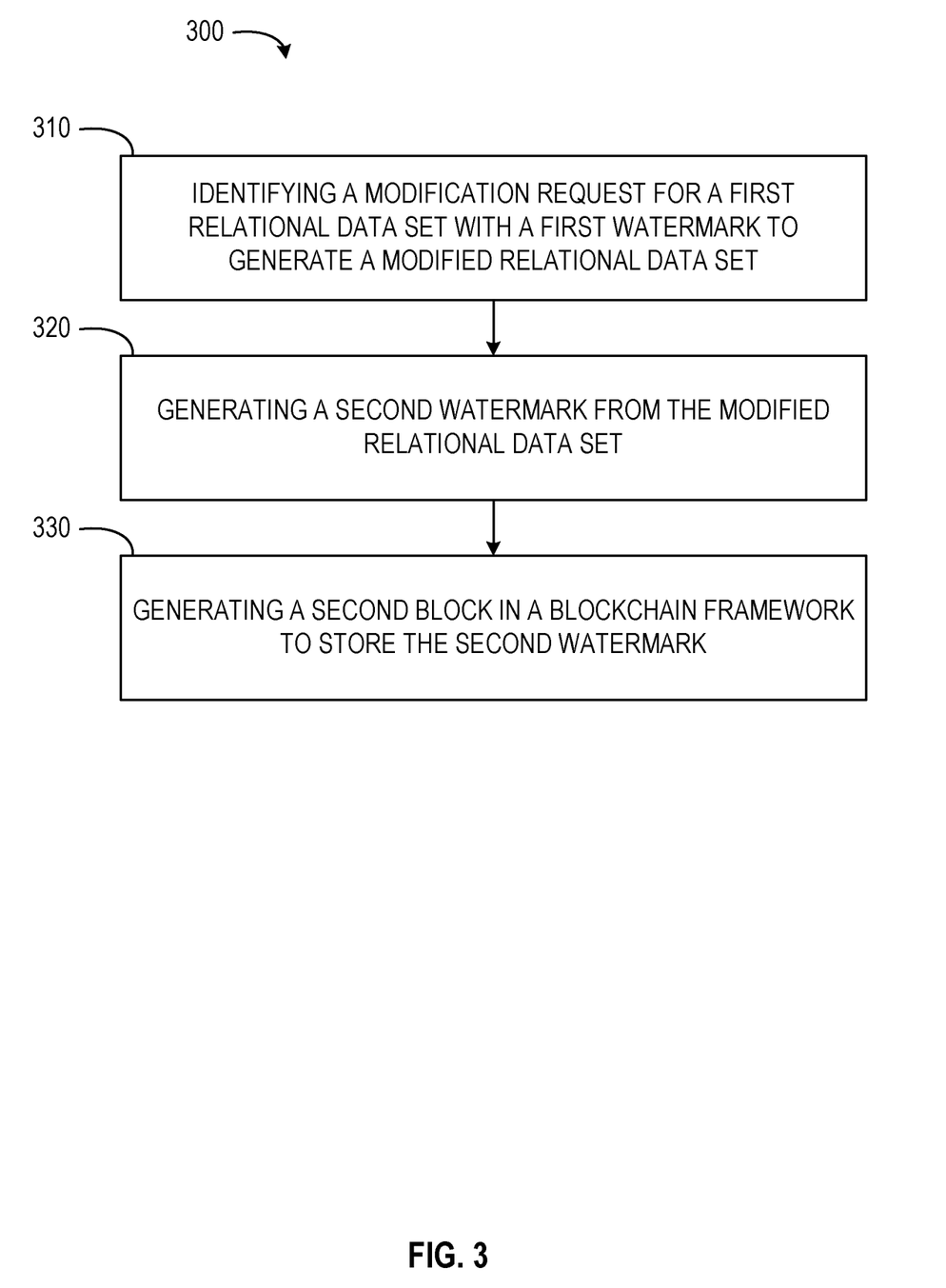
FIG. 3 depicts a flow diagram of a computer-implemented method for detecting data tampering with resilient watermarking, according to at least one embodiment.

The known, validated users and devices may be provided authorization to perform certain operations with respect to blocks of the private blockchain. In some instances, the users or devices may be authorized to interact with one or more blocks of the private blockchain to perform validation operations on data associated with the user, as discussed in more detail below. The block, generated in the blockchain framework of the data repository, may be an immutable element of the blockchain containing a hash or watermark for a specified data set of the data repository. Once generated, the blocks may not be changed. Changes to the data set associated with a block, such as adding information to the data set, may trigger generation of a subsequent block, as described below with respect to the method 300. The subsequent block may be generated as a block related to an original block for the data set. In some embodiments, subsequent blocks may be formed, at least in part, based on a prior related block for the associated data set.

In some embodiments, the block stores the watermark. In embodiments where the watermark is generated with the element template, the block stores the watermark and the element template. The block component 140 may generate the block to store the watermark "H" generated above in operation 230 and any corresponding template "T". In some embodiments, the template and the watermark (e.g., the hash) are protected from tampering within the block. This protection may enable the hash and the template to be used for validating the first relational data set. In some embodiments, the block component 140 protects the block by placing access protection safeguards on the block. The block component 140 may use valid private keys to limit or restrict access to the block to verified users or systems.

In some embodiments, the data repository, hosting the plurality of relational data sets, performs operations 210-240 for each data set stored within the data repository. The operations may be performed to generate a watermark and element template for each relational data set, as each relational data set is added to the data repository. In some embodiments, generation of the watermark and element template may be repeated for relational data sets which are modified by changing certain portions of data within a given relational data set. The changes to the given relational data sets, triggering generation of a new watermark and a new element template, may be authorized modifications for users or systems having authorization or permission to access, add, remove, or otherwise change data for a given relational data set stored on the data repository. As such, a block, watermark, and element template may be generated for each created or suitably modified relational data set.

Although described with respect to a block and blockchain framework, in some embodiments, the data integrity system 102 responds to generation of the watermark by securing the watermark in a secure, immutable format. Where an element template is generated to form the watermark, the element template may be secured along with the watermark in an immutable format. In some embodiments, the data integrity system 102 stores one or more of the watermark and the element template using one or more secure cloud storage services or operations. The data integrity system 102 store the watermark and element template using distributed ledger technologies other than blockchain, such as a distributed ledger using non-block data structures to store the watermark and element template. In some embodiments, the data integrity system 102 stores the watermark and element template in a centralized database separate from the data repository, such that access controls of a data set on the data repository may differ from access controls of a watermark and element template associated with the data set.

At operation 250, the verification component 150 verifies an integrity of the first relational data set based on the block and the watermark. In some embodiments, the verification component 150 verifies the first relational data set in response to an access request for the first relational data set. The access request may be associated with an analytic or other task from an authorized system or user. The verification component 150 may verify the first relational data set has not undergone tampering since generation of the watermark for the first relational data set. In some embodiments, once the verification component 150 verifies the integrity of the first relational data set, the verification component 150 may generate a user interface element or notification indicating the first relational data set has been validated. In some instances where the verification component 150 determines tampering has occurred, the verification component 150 generates a user interface element or notification noting that tampering has been found when comparing the original watermark with a newly obtained watermark generated from a current version of the first relational data set.

In some embodiments, verifying the integrity of the first relational data set is performed by generating a current watermark for the first relational data set. The current watermark may be generated after the verification component 150 validates the requesting party has submitted the private key, discussed above. The validation component 150 may then cooperate with the watermark component 130 to access the element template for the first relational data set. The element template may be used to generate the current watermark for the first relational data set at a current time.

The current watermark may be generated in a manner similar to or the same as described above in the operations of the method 200. The current watermark is generated based on accessing the first relational data set at a time subsequent to generating the watermark. In some instances, the current watermark is generated at a time contemporaneous to receiving the access request for the first relational data set.

The verification component 150 then compares the watermark (e.g., a previously generated watermark such as the watermark generated in operation 230) with the current watermark. If the current watermark is identical to the previous watermark, the first relational data set at a current time is identical to the first relational data set at the time of generating the previously generated watermark. If the current watermark and the previously generated watermark do not match, the first relational data set has been altered and the notification may be generated and presented to indicate the change or tampering.

In some embodiments, the watermark is generated and stored with a maximum row number, a maximum column number, or a combination thereof for the first relational data set. Values within the maximum row number and maximum column number may be used to generate the first watermark. Where a maximum row number is known for the first watermark, validating the first relational data set based on an existing watermark may be performed by generating and comparing a subsequent watermark. The subsequent watermark may be generated using values within the maximum number of rows at a time of generating the first watermark. Where a maximum column number is known for the first watermark, validating the first relational data set based on an existing watermark may be performed by generating and comparing a subsequent watermark generated using values within the maximum number of columns at a time of generating the first watermark. In embodiments where a maximum row number and a maximum column number are known, validation may be performed by generating a subsequent watermark using values within the maximum row and column numbers at a time of generating the first watermark.

FIG. 3 shows a flow diagram of an embodiment of a computer-implemented method 300 for detecting data tampering with resilient watermarking. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the access component 110 identifies a modification request. The modification request, once performed, may generate a modified relational data set. The modification request may indicate one or more data elements to be modified within a relational data set (e.g., the first relational data set) on the data repository. Where the first relational data set has a known maximum row number, a known maximum column number, or a combination thereof, the modification request may include a new maximum row number, a new maximum column number, or a combination thereof. The new maximum number of rows or columns may be associated with a time value, indicating a time at which the maximum number of rows or columns was changed by the modification request. The time indicator may be stored in a subsequent block, watermark, or element template.

The relational data set to be modified may have a first watermark. The first watermark may be generated at a time of generating the relational data set, saving the relational data set, or a previous modification of the relational data set. The first watermark may be stored in a first block of a blockchain framework for the data repository. The first watermark may be generated and stored as described above with respect to operations of the method 200, such as operations 220-240.

In operation 320, the watermark component 130 generates a second watermark from the modified relational data set. The second watermark may be generated in a manner similar to or the same as described above with respect to operation 230. In some embodiments, the second watermark is generated with a second element template. The second element template may be generated in a manner similar to or the same as described above with respect to operation 230. In some embodiments, the second watermark is generated using values within one or more of the new maximum row number, the new maximum column number, or combinations thereof.

In operation 330, the block component 140 generates a second block in the blockchain framework of the data repository. The second block stores the second watermark. The second watermark may correspond to the modified relational data set. Where the second watermark was generated with a second element template, the second block also stores the second element template along with the second watermark in the blockchain framework. The second block in the block chain may include the new maximum row number, the new maximum column number, or combinations thereof, as applicable to the modification request. Validation or access requests resulting in validation operations may be associated with a time, such that validation is performed based on a time for the first relational data set prior to or after the modification request.

Figure 4:
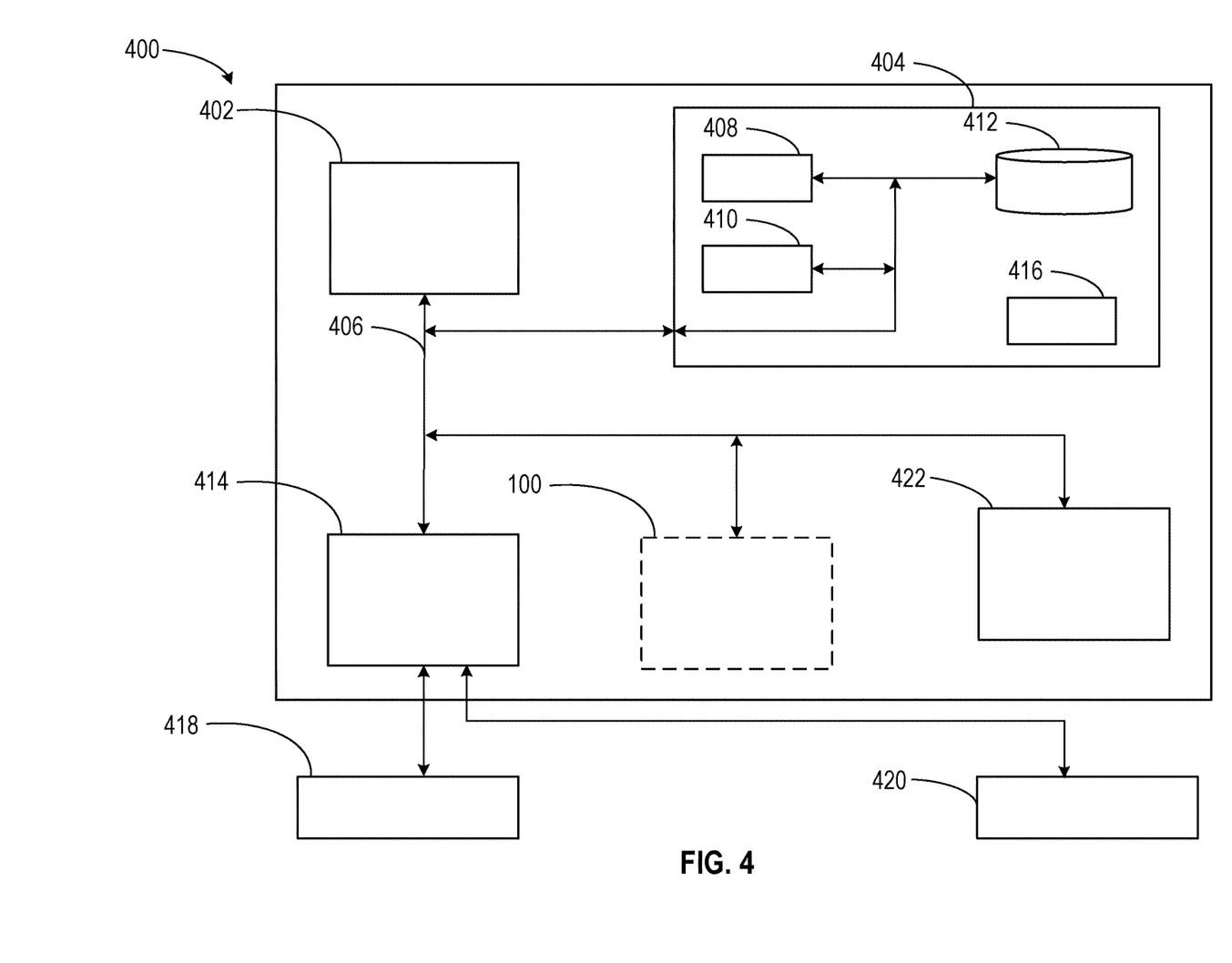
FIG. 4 depicts a block diagram of a computing system for detecting data tampering with resilient watermarking, according to at least one embodiment.

Embodiments of the present disclosure may be implemented together with virtually any type of computer, regardless of the platform being suitable for storing and/or executing program code. FIG. 4 shows, as an example, a computing system 400 (e.g., cloud computing system) suitable for executing program code related to the methods disclosed herein and for detecting data tampering with resilient watermarking.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the access component 110, the sorting component 120, the watermark component 130, the block component 140, and the verification component 150, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
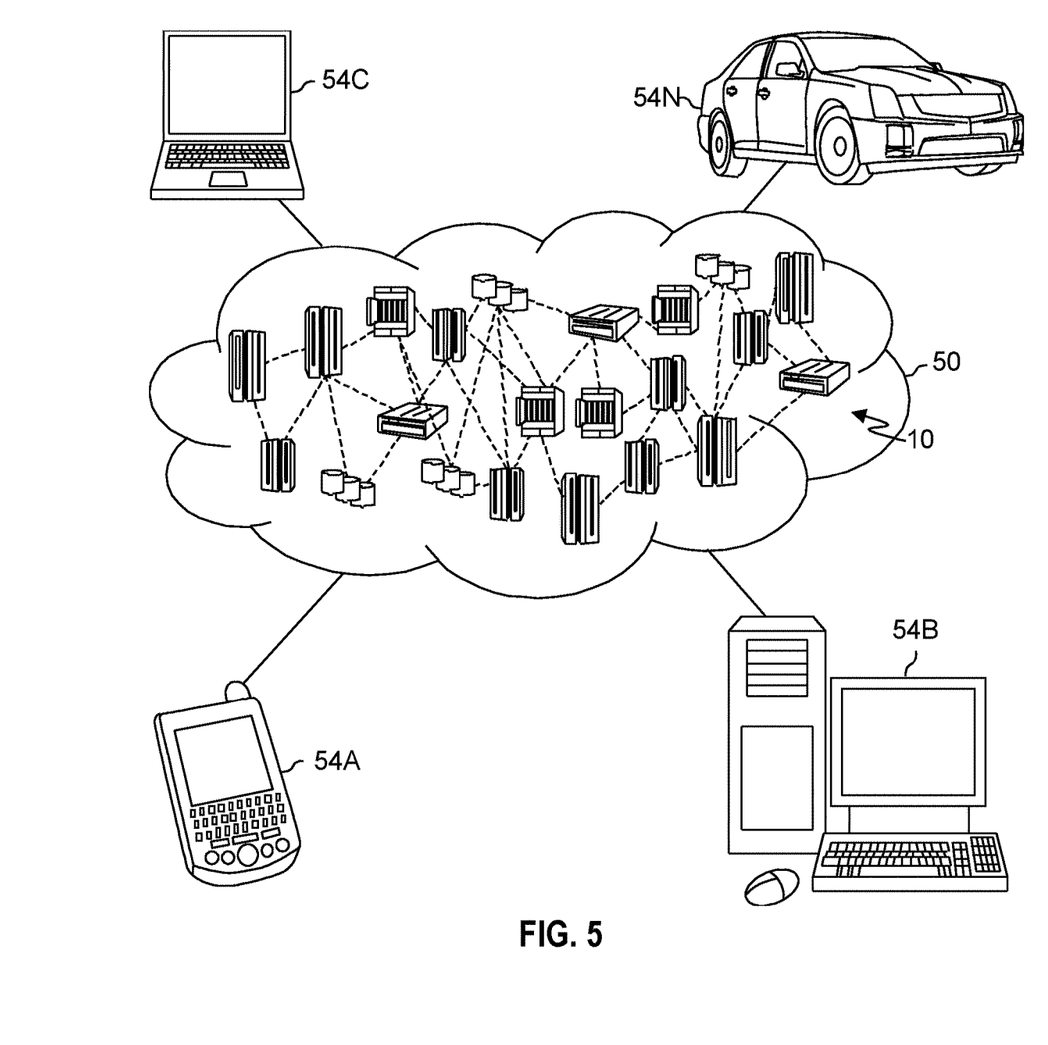
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
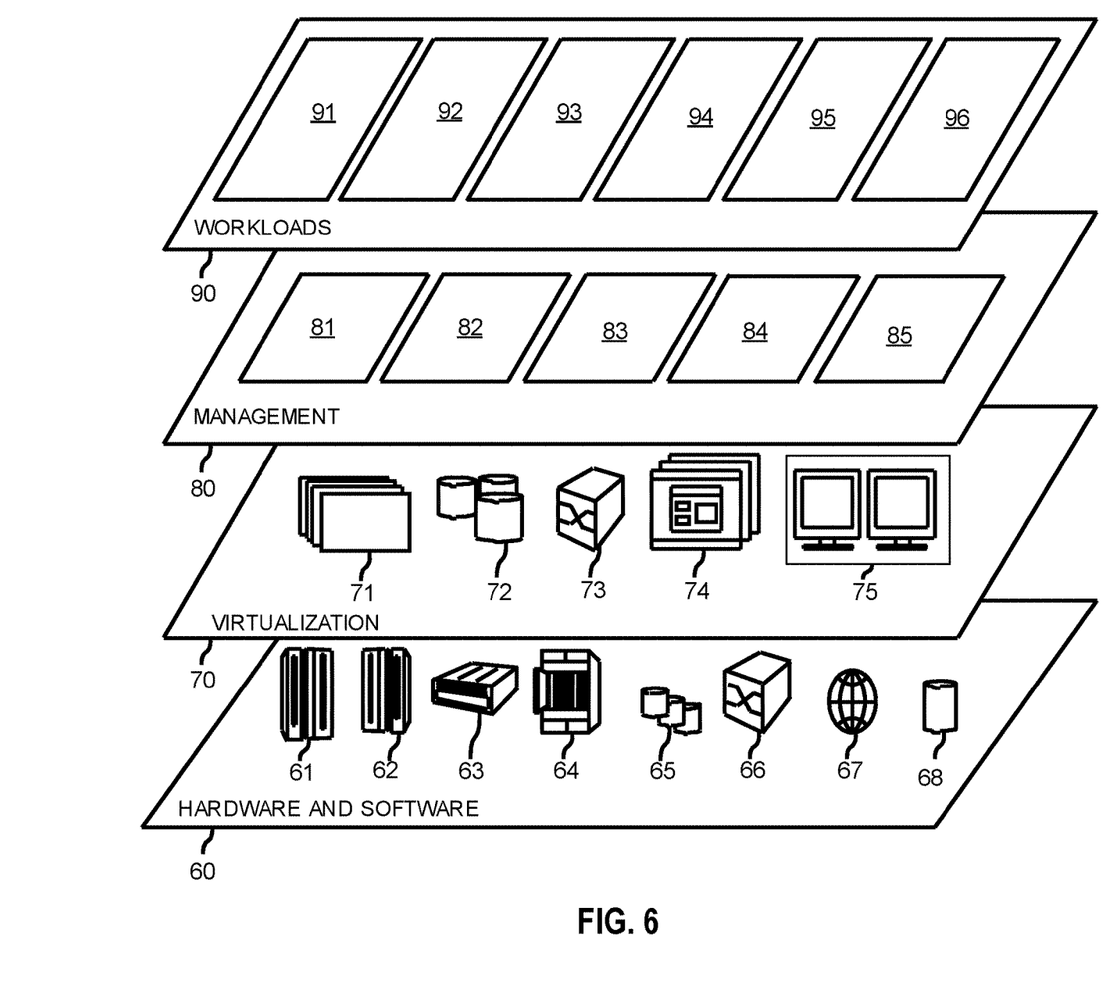
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:

accessing a first relational data set on a data repository having a plurality of relational data sets, the first relational data set including a plurality of data elements;

sorting the first relational data set to generate a first sorted list and a second sorted list of the plurality of data elements, the first sorted list generated based on a first categorical attribute of the first relational data set to include a first portion of data elements with numeric values and the second sorted list generated based on a second categorical attribute of the first relational data set to include a second portion of data elements with alphanumeric values;

determining a watermark length based on the first sorted list, the second sorted list, and a specified confidence threshold such that a selected number of data elements of the first sorted list and the second sorted list is sufficient to generate a confidence value above the specified confidence threshold;

generating a watermark from the first sorted list and the second sorted list and the watermark length, the watermark containing a hash corresponding to the first sorted list of numeric values and the second sorted list of alphanumeric values of the plurality of data elements; and in response to an access request for the first relational data set, verifying an integrity of the first relational data set based on the watermark.

2. The computer-implemented method of claim 1, wherein generating the watermark from the first sorted list and the second sorted list further comprises:

selecting a subset of data elements from the first sorted list and the second sorted list;

generating an element template from the subset of data elements and the first and second sorted lists; and generating the hash from the element template and the subset of data elements.

3. The computer-implemented method of claim 2, wherein selecting the subset of data elements from the first sorted list and the second sorted list provide a list of index values for the subset of data elements and wherein the element template contains a sequence of tuples, each tuple having a list value, for the first sorted list or the second sorted list, and an index value.

4. The computer-implemented method of claim 2, further comprising:

generating a block in a blockchain framework of the data repository, the block storing the watermark and the element template.

5. The computer-implemented method of claim 4, wherein the watermark is a first watermark and the block is a first block, the method further comprising:

identifying a modification request indicating one or more data elements to be added to the first relational data set, the modification request generating a modified relational data set;

generating a second watermark from the modified relational data set; and generating a second block in the blockchain framework of the data repository, the second block storing the second watermark corresponding to the modified relational data set.

6. The computer-implemented method of claim 2, wherein verifying the integrity of the first relational data set further comprises:

generating a current watermark for the first relational data set, the current watermark generated based on accessing the first relational data set at a time subsequent to generating the watermark; and comparing the watermark with the current watermark.

7. The computer-implemented method of claim 1, wherein the watermark is generated by a probabilistic selection of data elements from the first sorted list and the second sorted list.

8. A system, comprising:

one or more processors; and a computer-readable storage medium, coupled to the one or more processors, storing program instructions that, when executed by the one or more processors, cause the one or more processors to perform operations comprising:

accessing a first relational data set on a data repository having a plurality of relational data sets, the first relational data set including a plurality of data elements;

sorting the first relational data set to generate a first sorted list and a second sorted list of the plurality of data elements, the first sorted list generated based on a first categorical attribute of the first relational data set to include a first portion of data elements with numeric values and the second sorted list generated based on a second categorical attribute of the first relational data set to include a second portion of data elements with alphanumeric values;

determining a watermark length based on the first sorted list, the second sorted list, and a specified confidence threshold such that a selected number of data elements of the first sorted list and the second sorted list is sufficient to generate a confidence value above the specified confidence threshold;

generating a watermark from the first sorted list and the second sorted list and the watermark length, the watermark containing a hash corresponding to the first sorted list of numeric values and the second sorted list of alphanumeric values of the plurality of data elements; and in response to an access request for the first relational data set, verifying an integrity of the first relational data set based on the watermark.

9. The system of claim 8, wherein generating the watermark from the first sorted list and the second sorted list further comprises:

selecting a subset of data elements from the first sorted list and the second sorted list;

generating an element template from the subset of data elements and the first and second sorted lists; and generating the hash from the element template and the subset of data elements.

10. The system of claim 9, wherein selecting the subset of data elements from the first sorted list and the second sorted list provide a list of index values for the subset of data elements and wherein the element template contains a sequence of tuples, each tuple having a list value, for the first sorted list or the second sorted list, and an index value.

11. The system of claim 9, further comprising:
generating a block in a blockchain framework of the data repository, the block storing the watermark and the element template.

12. The system of claim 11, wherein the watermark is a first watermark and the block is a first block, the operations further comprising:
identifying a modification request indicating one or more data elements to be added to the first relational data set, the modification request generating a modified relational data set;
generating a second watermark from the modified relational data set; and
generating a second block in the blockchain framework of the data repository, the second block storing the second watermark corresponding to the modified relational data set.

13. The system of claim 9, wherein verifying the integrity of the first relational data set further comprises:
generating a current watermark for the first relational data set, the current watermark generated based on accessing the first relational data set at a time subsequent to generating the watermark; and
comparing the watermark with the current watermark.

14. The system of claim 8, wherein the watermark is generated by a probabilistic selection of data elements from the first sorted list and the second sorted list.

15. A computer program product comprising a computer readable storage medium having program instructions embodied therewith, the program instructions being executable by one or more processors to cause the one or more processors to perform operations comprising:
accessing a first relational data set on a data repository having a plurality of relational data sets, the first relational data set including a plurality of data elements;
sorting the first relational data set to generate a first sorted list and a second sorted list of the plurality of data elements, the first sorted list generated based on a first categorical attribute of the first relational data set to include a first portion of data elements with numeric values and the second sorted list generated based on a second categorical attribute of the first relational data set to include a second portion of data elements with alphanumeric values;
determining a watermark length based on the first sorted list, the second sorted list, and a specified confidence threshold such that a selected number of data elements of the first sorted list and the second sorted list is sufficient to generate a confidence value above the specified confidence threshold;
generating a watermark from the first sorted list and the second sorted list and the watermark length, the watermark containing a hash corresponding to the first sorted list of numeric values and the second sorted list of alphanumeric values of the plurality of data elements; and
in response to an access request for the first relational data set, verifying an integrity of the first relational data set based on the watermark.

16. The computer program product of claim 15, wherein generating the watermark from the first sorted list and the second sorted list further comprises:
selecting a subset of data elements from the first sorted list and the second sorted list;
generating an element template from the subset of data elements and the first and second sorted lists; and
generating the hash from the element template and the subset of data elements.

17. The computer program product of claim 16, wherein selecting the subset of data elements from the first sorted list and the second sorted list provide a list of index values for the subset of data elements and wherein the element template contains a sequence of tuples, each tuple having a list value, for the first sorted list or the second sorted list, and an index value.

18. The computer program product of claim 16, further comprising:
generating a block in a blockchain framework of the data repository, the block storing the watermark and the element template.

19. The computer program product of claim 18, wherein the watermark is a first watermark and the block is a first block, the operations further comprising:
identifying a modification request indicating one or more data elements to be added to the first relational data set, the modification request generating a modified relational data set;
generating a second watermark from the modified relational data set; and
generating a second block in the blockchain framework of the data repository, the second block storing the second watermark corresponding to the modified relational data set.

20. The computer program product of claim 16 wherein verifying the integrity of the first relational data set further comprises:
generating a current watermark for the first relational data set, the current watermark generated based on accessing the first relational data set at a time subsequent to generating the watermark; and
comparing the watermark with the current watermark.

* * * * *